(12) United States Patent
Laake

(10) Patent No.: US 8,280,116 B2
(45) Date of Patent: Oct. 2, 2012

(54) GLACIAL GEOMORPHOLOGIC MAPPING

(75) Inventor: Andreas Laake, Kingston (GB)

(73) Assignee: WesternGeco L.L.C., Houston, TX (US)

( * ) Notice: Subject to any disclaimer, the term of this patent is extended or adjusted under 35 U.S.C. 154(b) by 976 days.

(21) Appl. No.: 12/267,575

(22) Filed: Nov. 8, 2008

(65) Prior Publication Data

US 2010/0119118 A1 May 13, 2010

(51) Int. Cl.
*G06K 9/00* (2006.01)
(52) U.S. Cl. .......................... 382/109; 382/113; 382/100
(58) Field of Classification Search .................. None
See application file for complete search history.

(56) References Cited

U.S. PATENT DOCUMENTS

| | | | |
|---|---|---|---|
| 2007/0264781 A1 | 11/2007 | Behammer | |
| 2007/0265781 A1 | 11/2007 | Nemethy et al. | |
| 2008/0133554 A1 | 6/2008 | Lee et al. | |

OTHER PUBLICATIONS

Smith et al., Geomorphological mapping of glacial landforms from remotely sensed data: An evaluation of the principal data sources and an assessment of their quality, Geomorphology 76 (2006), pp. 148-165.*

Astakhov et al., Marginal formations of the last Kara and Barents ice sheets in northern European Russia, Boreas, vol. 28, 1999, pp. 23-45.*

Paul et al., Combining satellite multispectral image data and a digital elevation model for mapping debris-covered glaciers, Remote Sensing of Environment, vol. 89 (2004), pp. 510-518.*

Astakhov, et al, Marginal Formations of the last Kara and Barents Ice Sheets in Northern European Russia. Boreas, Mar. 1999,pp. 23-45, vol. 28, Oslo.

Kaab, et al, Evolution of a High Mountain Thermokarst Lake in the Swiss Alps, Arctic, Antarctic and Alpine Research, pp. 385-390, vol. 33(4), 2001.

Hinzman, et al, Evidence and Implications of recent Climate change in Northern Alaska and other Arctic Regions, Climatic Change, 2005, pp. 251-298, vol. 72.

NASA, An Introductory Landsat Tutorial, https://zulu.ssc.nasa.gov/mrsid/tutorial/Landsat%20Tutorial-V1.html Sep. 29, 2008.

Short, et al, Geomorphology from Space, NASA, 1986. URL : http://geoinfo.amu.edu.pl/wpk/geos/GEO_COMPLETE_TOC.html, Sep. 19, 2007.

Bishop et al., Chapter 8: Cartography and Visualization in Mountain Geomorphology, Geographic Information Science and Mountain Geomorphology, 2004.

PCT Search Report, dated May 14, 2010, Application No. PCT/US2009/062092.

* cited by examiner

Primary Examiner — Tom Y Lu
Assistant Examiner — Thomas Conway

(57) ABSTRACT

Described herein are implementations of various technologies for a method for mapping glacial geomorphology. A satellite image of an area of interest may be received. A digital elevation model of the area of interest may be received. Plains and ridges may be identified on the digital elevation model. Swamps and forest may be identified on the satellite image. A glaciological map may be generated having glacial features based on the identified plains, ridges, swamps and forest.

20 Claims, 10 Drawing Sheets

| RED | LIGHT GREEN | RED | DARK PURPLE |
|---|---|---|---|
| CYAN | DARK GREEN | DARK GREEN | DARK PURPLE |

| SWAMP | MEADOW | SWAMP | INFRA-STRUCTURE |
|---|---|---|---|
| ICE, SNOW, CLOUDS | FOREST | FOREST | INFRA-STRUCTURE |

| P | M | P | E |
|---|---|---|---|
| M | P | RP | E |

210C

| SWAMP | MEADOW | SWAMP | INFRA-STRUCTURE |
|---|---|---|---|
| ICE, SNOW, CLOUDS | FOREST | FOREST | INFRA-STRUCTURE |

310B

| GROUND MORAINE | NON-GLACIAL | GROUND MORAINE | NON-GLACIAL |
|---|---|---|---|
| NON-GLACIAL | NON-GLACIAL | TERMINAL/ LATERAL MORAINE | NON-GLACIAL |

GLACIAL GEOMORPHOLOGIC MAPPING

BACKGROUND

1. Field of the Invention

Implementations of various technologies described herein generally relate to methods and systems for glacial geomorphologic mapping.

2. Description of the Related Art

The following descriptions and examples are not admitted to be prior art by virtue of their inclusion within this section.

Geomorphology is a science of landforms that studies the evolution of the earth's surface and interprets landforms as records of geological history. More specifically, glacial geomorphology studies the evolution of the earth's surface as shaped by glaciers. Glacial geomorphology is useful for the exploration of natural resources of the arctic regions. Typically, the geomorphologic interpretation of glacial features uses surface geologic mapping validated by satellite imagery.

Moraines are glacial features that may be of particular interest in glacial geomorphology. The term, moraine, refers to any glacially formed accumulation of unconsolidated glacial debris, such as, soil and rock. The debris may occur in currently and formerly glaciated regions. This debris may have been plucked off the valley floor or fallen off of valley walls as a glacier advanced. Moraines may be composed of debris ranging in size from a silt-like material called glacial flour, to large boulders. Moraines may be located on the glacier's surface or deposited where the glacier has melted.

Different types of moraines include lateral moraines, ground moraines, and terminal moraines. Lateral moraines are parallel ridges of debris deposited along the sides of a glacier. The debris is deposited on top of the glacier by frost shattering of the valley walls and from tributary streams flowing into the valley. The till is carried along the glacial boundary until the glacier melts. Because lateral moraines are deposited on top of the glacier, they do not experience the post-glacial erosion of the valley floor and therefore, as the glacier melts, lateral moraines are usually preserved as high ridges.

Ground moraines are till-covered areas with irregular topography and no ridges. Ground moraines often form gently rolling hills or plains. The debris of ground moraines may be deposited as the glacier retreats. The ground moraine is typically located between the two lateral moraines.

Terminal moraines are ridges of unconsolidated debris deposited at the terminus, or end of the glacier. Typically, terminal moraines reflect the shape of the glacier's terminus. Glaciers act much like a conveyor belt carrying debris from the top of the glacier to the bottom, where the debris is deposited in terminal moraines. The longer the terminus of the glacier stays in one place, the more accumulation there will be. Terminal moraines typically mark the maximum advance of the glacier.

SUMMARY

Described herein are implementations of various technologies for a method for mapping glacial geomorphology. In one implementation, a satellite image of an area of interest may be received. A digital elevation model of the area of interest may be received. Plains and ridges may be identified on the digital elevation model. The identification of plains and ridges may be used to estimate seismic surface wave velocities, surface wave noise, and seismic wave attenuation.

In another implementation, swamps and forest may be identified on the satellite image. A glaciological map may be generated having glacial features based on the identified plains, ridges, swamps and forest. The glaciological map may be generated by correlating the swamps with the plains, and the ridges with the forest.

Glacial features may include lateral moraines, terminal moraines, and ground moraines. Based on the glacial features, boundaries of glaciers may be identified. Each glacier may be defined by lateral moraines on opposite sides of the glacier, a terminal moraine at an end of the glacier, and a ground moraine disposed between the lateral moraines and the terminal moraine. A sequence of glacial advancement of the glaciers may then be reconstructed where the glacier having the best preserved glacial features is displayed last. The reconstruction of the sequence may be used for logistical planning of a seismic acquisition.

In another implementation, the plains and ridges may be identified by performing a statistical analysis on flat terrain, structured terrain, and escarpments. Flat terrain may be identified as areas on the digital elevation model having a gradient of less than five percent Structured terrain may be identified as areas on the digital elevation model having a gradient greater than five percent and less than twenty percent. Escarpments may be identified as areas on the digital elevation model having a gradient greater than twenty percent. In one implementation, the statistical analysis may be performed by creating a hypsographic curve of the areas identified as flat terrain, structured terrain, and escarpments.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

FIGS. 3A-3B illustrate satellite images according to implementations described herein.

FIG. 4 illustrates a digital elevation model, a satellite image, and a glaciological map according to implementations described herein.

DETAILED DESCRIPTION

The discussion below is directed to certain specific implementations. It is to be understood that the discussion below is only for the purpose of enabling a person with ordinary skill in the art to make and use any subject matter defined now or later by the patent "claims" found in any issued patent herein.

The following paragraph provides a brief summary of various techniques described herein. In general, a digital elevation model is used to identify gradients of an area of interest. The gradients may be used to identify topographical features in the area of interest. Topographical features may include ridges and plains. A satellite image of the area of interest may be used to identify land-use classes. Land-use classes may include swamps and plains. The intersection of topographical features and land-use classes may be used to identify glacial features in the area of interest. The intersection of ridges and forests may identify lateral or terminal moraines. The intersection of swamps and plains may identify ground moraines. Glacial boundaries that outline glaciers may be drawn using the glacial features. The advancement of the glaciers outlined by the boundaries may then be reconstructed. One or more implementations of various techniques for glacial geomorphologic mapping will now be described in more detail with reference to FIGS. 1-6 in the following paragraphs.

Figure 1:
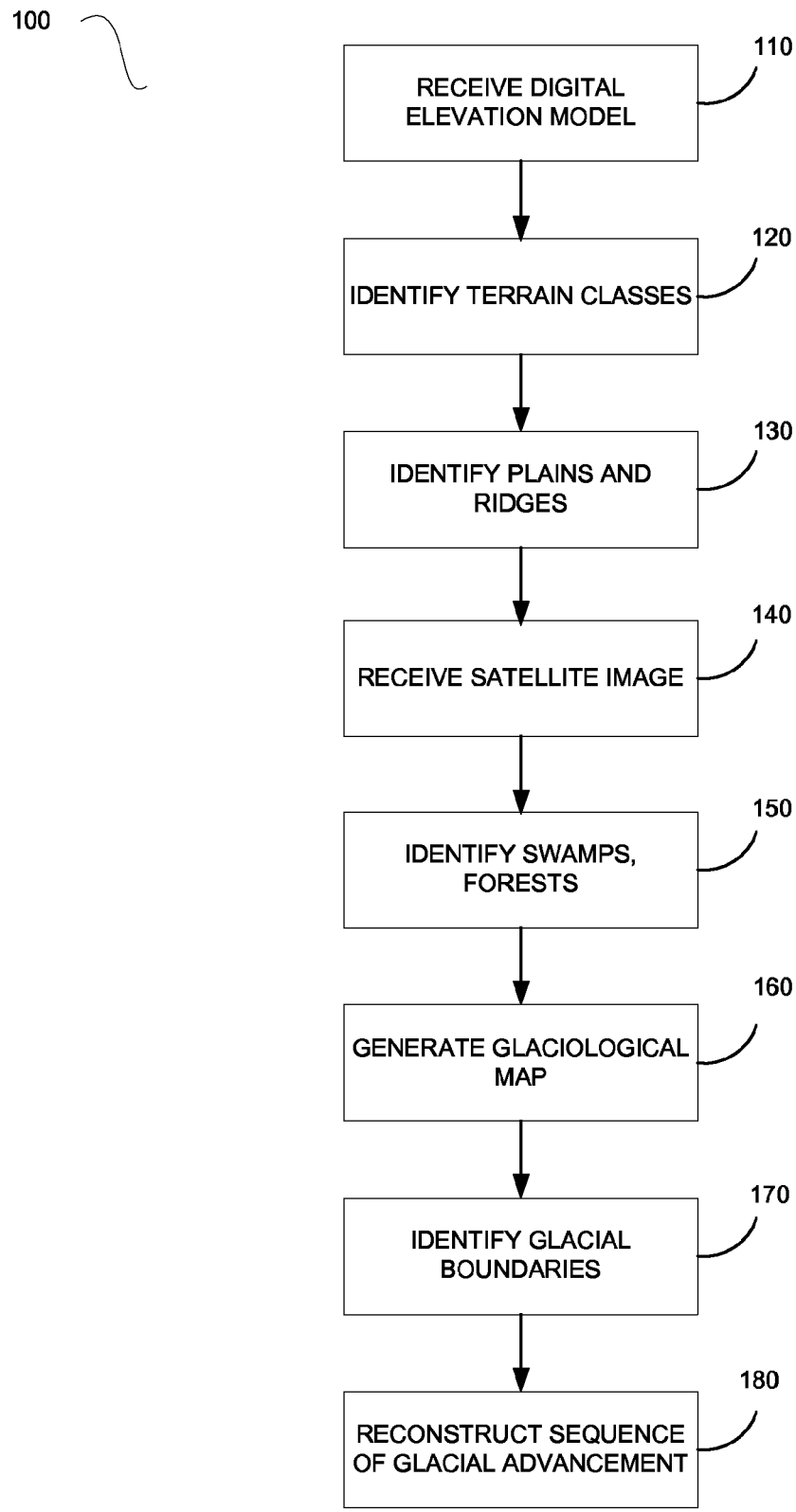
FIG. 1 illustrates a flowchart of a method for glacial geomorphologic mapping in accordance with one or more implementations of various techniques described herein.
Figure 5A:
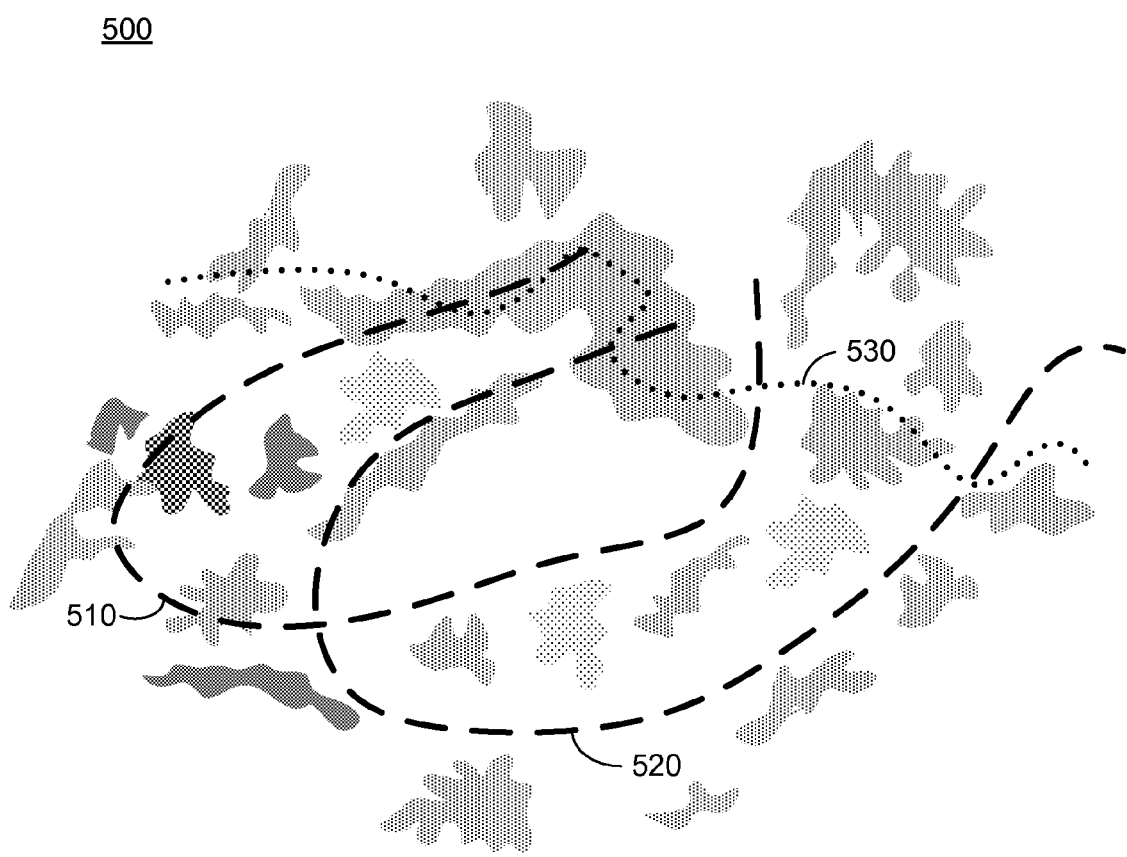
FIG. 5A illustrates a glaciological map in accordance with implementations described herein.

FIG. 1 illustrates a flowchart of a method 100 for glacial geomorphologic mapping in accordance with one or more implementations of various techniques described herein. Method 100 will be described with reference to FIGS. 2A-2D, which illustrate digital elevation models 210A-210D according to implementations described herein; FIGS. 3A-3B, which illustrate satellite images 310A-310B according to implementations described herein; FIG. 4, which illustrates a digital elevation model 210C, a satellite image 310B, and a glaciological map 410 according to implementations described herein; FIG. 5A, which illustrates a glaciological map in accordance with implementations described herein; and FIGS. 5B-5D, which illustrate a reconstruction of a sequence of glacial advancement in accordance with implementations described herein.

Glacial geomorphologic mapping may be performed through an analysis of the digital elevation model 210A and the satellite image 310A of an area of interest. The area of interest may be an area of groundwater management, hydrocarbon exploration, or other geotechnical projects.

At step 110, the digital elevation model 210A may be received. The digital elevation model may be a digital representation of ground surface topography or a subsurface horizon. In one implementation, the area of interest may be subdivided by a grid, as shown in the digital elevation model 210A. Each cell 220 of the grid may represent a fixed area within the area of interest. For example, each cell 220 may represent a 30 meter (m) by 30 m area of terrain. Additionally, the digital elevation model 210A may include an elevation for the terrain within each cell 220.

At step 120, terrain classes may be identified on the digital elevation model 210A. In other words, a terrain class may be identified for each cell 220 in the digital elevation model 210A. Terrain classes may include flat terrain, structured terrain, and escarpments. Flat and structured terrains may contain moraines. The identification of escarpments may be useful for logistics planning. For example, the identification of escarpments may be used to indicate locations where access by vehicles may be impossible. Also, escarpments may detrimentally affect data collection for geotechnical projects due to the scattering of seismic waves.

In one implementation, the terrain classes may be based on a gradient value. In other words, a gradient, or slope, of each cell 220 may be determined. The cells 220 may then be identified as terrain classes depending on the gradient value for the cell 220. TABLE 1 illustrates example gradient values for terrain classes.

TABLE 1

| TERRAIN CLASS | GRADIENT |
| --- | --- |
| FLAT | <5% |
| STRUCTURED | 5 TO 20% |
| ESCARPMENT | >20% |

Figure 2A:
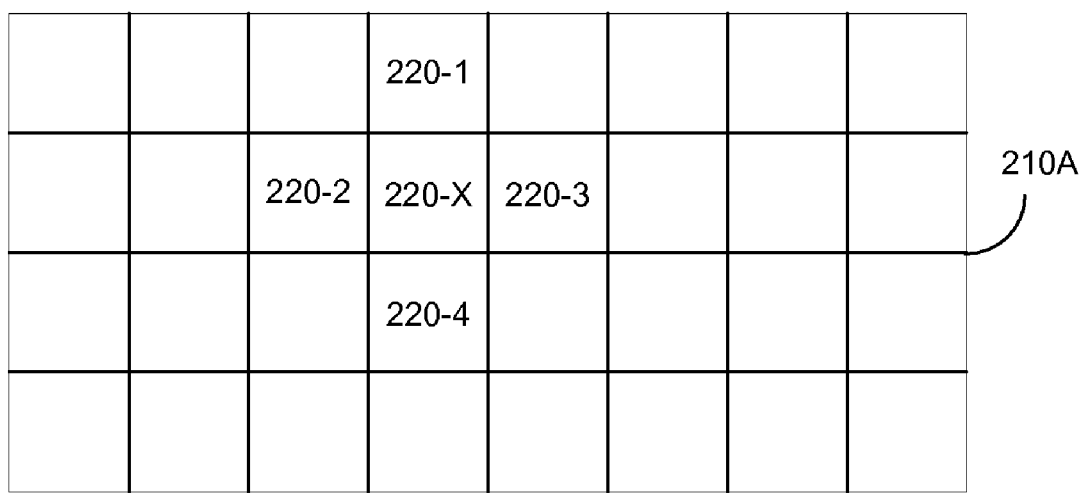
FIGS. 2A-2D illustrate digital elevation models according to implementations described herein.

In one implementation, the gradient for each cell 220 may be determined by comparing the elevations of neighboring cells in a north-south and east-west direction. Referring to FIG. 2A, for example, the gradient at cell 220-X may be determined by the difference in elevation from cell 220-1 to 220-4 (north-south) and the difference in elevation from cell 220-2 to 220-3 (east-west).

After identifying terrain classes, the topography classification may be further refined. At step 130, plains and ridges may be identified on the digital elevation model 210-A. The identification of plains and ridges may be based on the terrain classes for each cell 220. In one implementation, a statistical analysis on the identified terrain classes may be performed to identify regions of areas as plains or ridges. In such an implementation, neighboring cells may be grouped together to form a region. The occurrence of certain percentages of terrain classes within a region may be used to identify plains, ridges, or some other topography.

TABLE 2 illustrates the relationship between terrain classes and the more refined topographies. As shown, from the digital elevation model (DEM), three terrain classes are identified. For regions with strictly flat terrain, plains may be identified. For regions with flat terrain and structured terrain, ridges on plains may be identified. For regions with strictly structured terrain, mountains may be identified. Escarpments may not be further refined.

TABLE 2

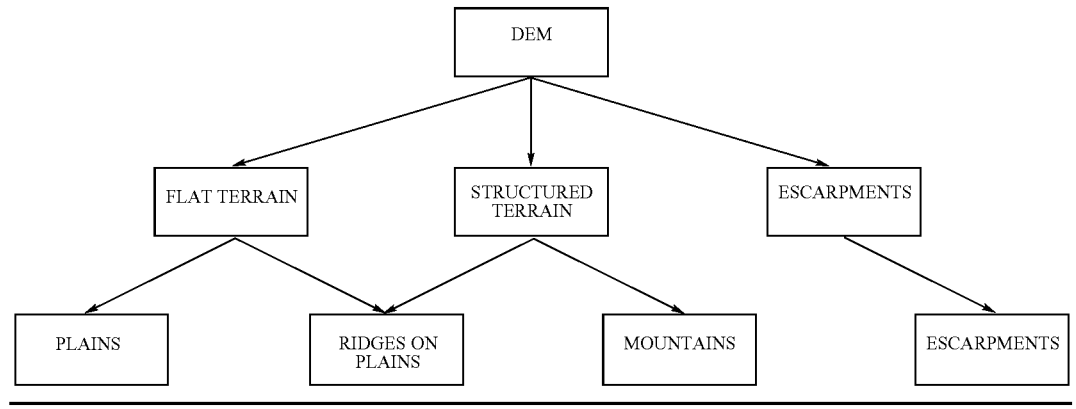

Figure 2B:
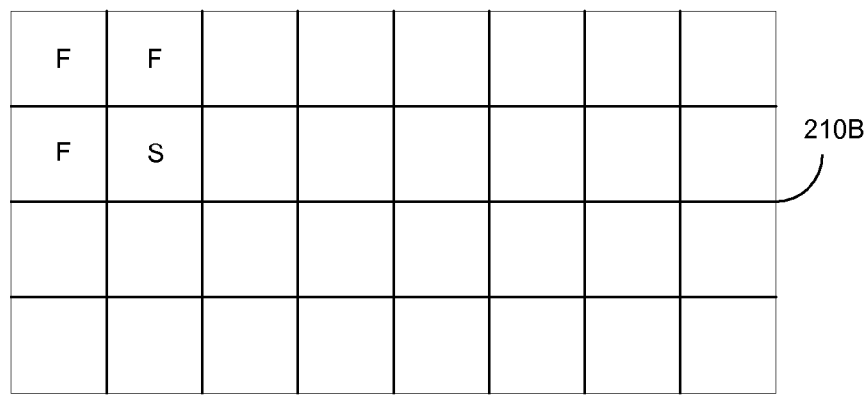

For example, FIG. 2B illustrates a digital elevation model 210B with four cells identified as terrain classes, three identified as "F" (flat), and one cell identified as "S" (structured). These four cells may be grouped into a single region 230, as shown in FIG. 2C.

Figure 2C:
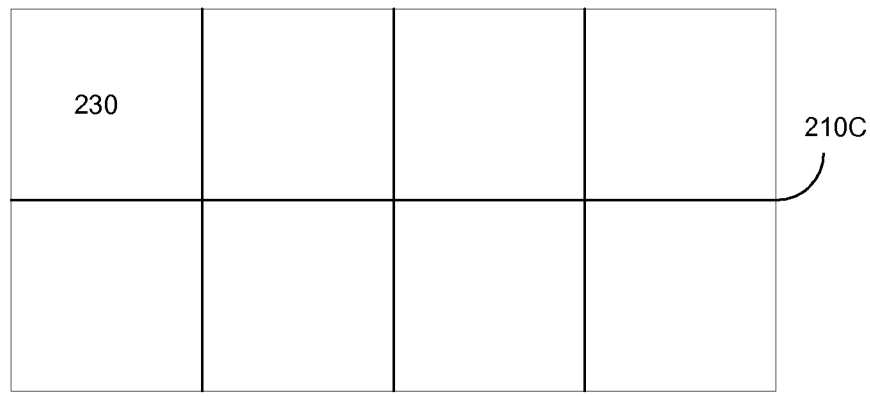

FIG. 2C illustrates a digital elevation model 210C. The digital elevation model 210C may represent the digital elevation model 210B organized by regions. In the digital elevation model 210C, a region 230 may contain the four terrain classes illustrated in the digital elevation model 210B. Because the region 230 is 75% flat terrain (3 of the 4 cells are flat), the region 230 may be identified as a plain P, as shown in FIG. 2D.

Figure 2D:
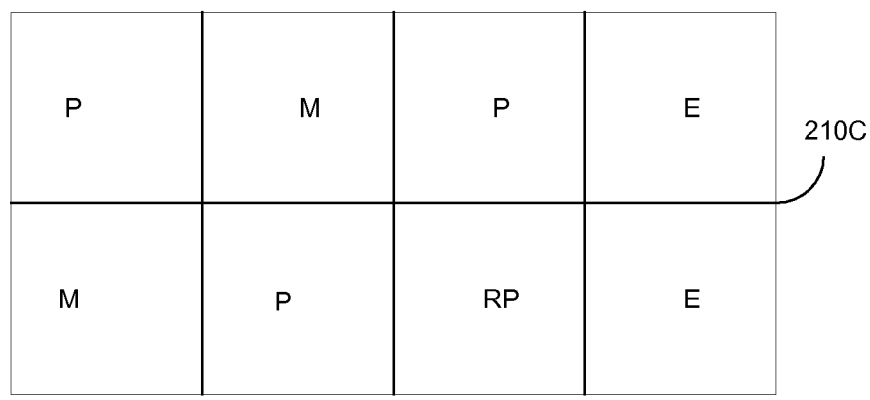

FIG. 2D illustrates the digital elevation model 210C with all the regions identified as "P" (plains), "M" (mountains), "E" (escarpments), and "RP" (ridges on plains). It should be noted that the percentage listed here is merely for the purpose of illustration, and is not intended to limit implementations described herein. The categorization of topographies by percentages may vary in implementations of various technologies described herein.

In one implementation, the statistical analysis may be performed by creating a hypsographic curve. A hypsographic curve may be a graph that shows the proportion of land area that exists at various elevations by plotting relative area against relative height. In such an implementation the local elevation values may be binned into the terrain classes, i.e., flat terrain, structured terrain, and escarpments. The hypsographic curve may be computed from the cumulative sum of the number of terrain classes per region. The identification of plains and ridges may then be determined based on the hypsographic curve.

At step 140, the satellite image 310A of the area of interest may be received. In one implementation, the satellite image may be a remote sensing satellite image. Remote sensing is the acquisition of information of an object, by the use of either recording or real-time sensing device(s) that are not in physical contact with the object. The remote sensing satellite image may measure reflected sunlight from the area of interest. In one implementation, the satellite image 310A may be a continuous color red-green-blue (RGB) image. In such an implementation, the satellite image 310A may be generated from Landsat bands 7, 4, and 2.

Similar to the digital elevation models, the area of interest in the satellite image 310A may be subdivided by a grid. Each cell of the grid may represent a region in the digital elevation model 210C. As shown, the satellite image 310A may include a color for each region.

At step 150, swamps and forests may be identified for each region. Swamps and forests are examples of land-use classes that can be distinguished from each other based on vegetation type. In one implementation, land-use classes may be identified based on the color of the region in the satellite image 310A. Identifying swamps and forests may be useful because these land-use classes may contain moraines. FIG. 3B illustrates a satellite image 310B with land-use classes identified based on the colors for the regions in the satellite image 310A. TABLE 3 illustrates an example of colors and their respective land-use classes.

TABLE 3

| LAND-USE CLASS | COLOR |
|---|---|
| WATER | DARK BLUE |
| ICE, SNOW, CLOUDS | CYAN |
| INFRASTRUCTURE | DARK PURPLE |
| SOIL, SAND | LIGHT PURPLE, YELLOW |
| FOREST | DARK GREEN |
| MEADOWS | LIGHT GREEN |
| SWAMPS, PEAT | RED |
| WEATHERED BASEMENT ROCK | DARK PURPLE TO GRAY |

At step 160, a glaciological map 410 may be generated. The glaciological map may contain glacial features. The glacial features may be identified based on the identified plains and ridges in the digital elevation model, and the swamps and forests in the satellite image. More specifically, the glacial features may be identified through a correlation matrix of topography and land-use classes. TABLE 4 illustrates the correlation matrix. "N/A" stands for not applicable because a swamp cannot occur on a ridge.

TABLE 4

| | LAND USE | |
|---|---|---|
| TOPOGRAPHY | SWAMP | FOREST |
| PLAINS | GROUND MORAINE | NON-GLACIAL |
| RIDGES | N/A | TERMINAL/LATERAL MORAINES |

For example, FIG. 4 illustrates the glaciological map 410 generated based on the identified plains and ridges in the digital elevation model 210C and the identified swamps and forests in the satellite image 310B. As shown, ground moraines may be identified based on the correlation of plains P and swamps. Lateral or terminal moraines may be identified based on the correlation of ridges RP and forests. All other regions may be identified as non-glacial.

At step 170, glacial boundaries may be identified based on the glacial features in the glaciological map 410. The boundaries of a single glacier may be identified through the identification of a feature group. The feature group may include a lateral moraine on each side of a glacier, a terminal moraine at the end of the glacier, and a ground moraine disposed between the two lateral moraines and the terminal moraine.

For example, FIG. 5A illustrates a glaciological map 500 with glacial boundaries 510, 520, and 530. The shading in the glaciological map 500 may represent lateral, terminal and ground moraines. Each of the boundaries 510, 520, and 530 may represent the outline of one glacier. It should be noted that not in some scenarios, moraines may occur outside of a feature group. In such a scenario, the moraines may represent an ice sheet, instead of a glacier. For example, the boundary may represent an ice sheet that is indicated by the occurrence of terminal moraines.

At step 180, a sequence of glacial advancement of the glaciers 510, 520 and may be reconstructed. The sequence of the glacial advancement may be determined based on the state of preservation of the glacial features in comparison to each other. For example, the glacier with glacial features that are best preserved in comparison to other glaciers may be the last glacier that advanced.

Figure 5B:
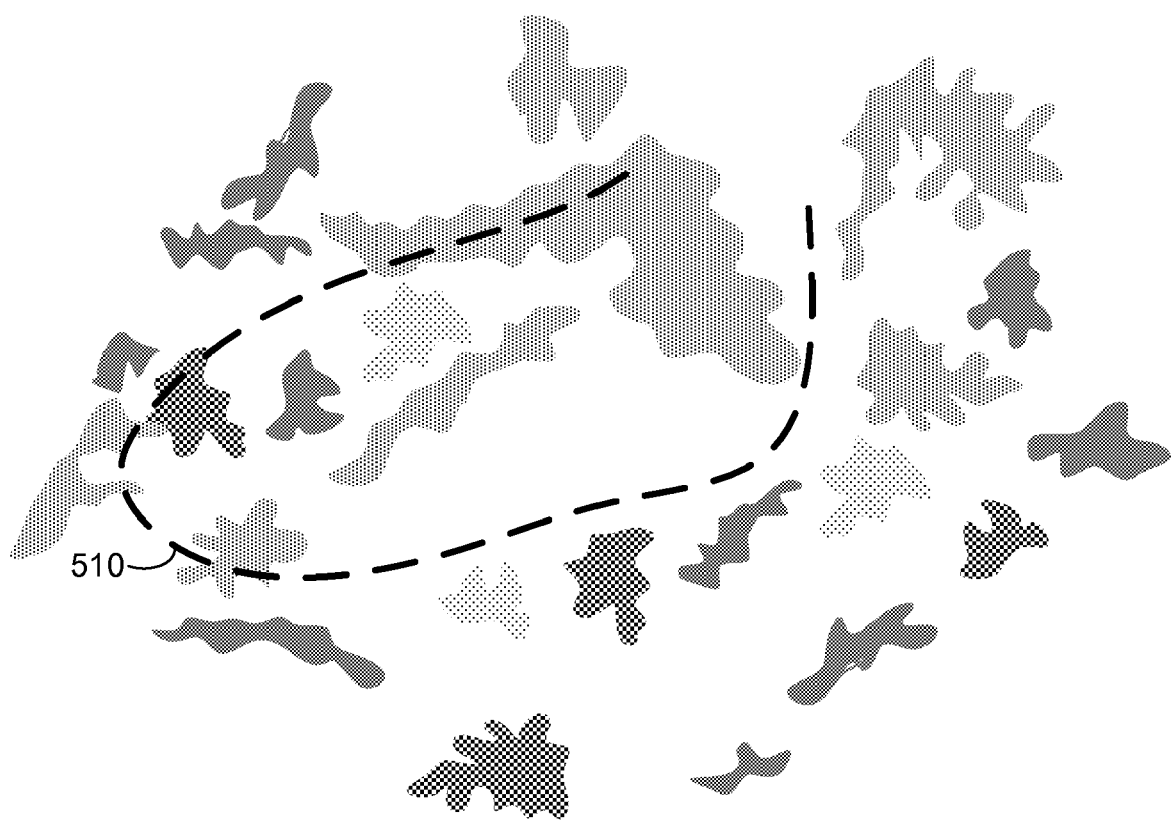
FIGS. 5B-5D illustrate a reconstruction of a sequence of glacial advancement in accordance with implementations described herein.
Figure 5C:
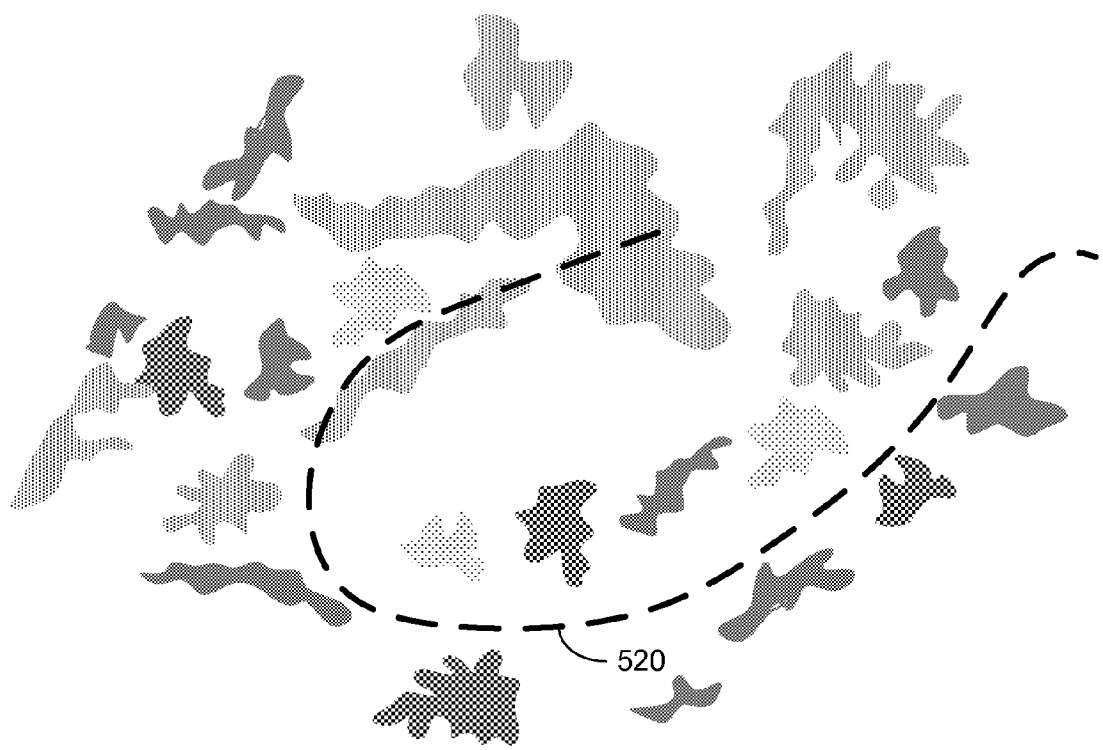
Figure 5D:
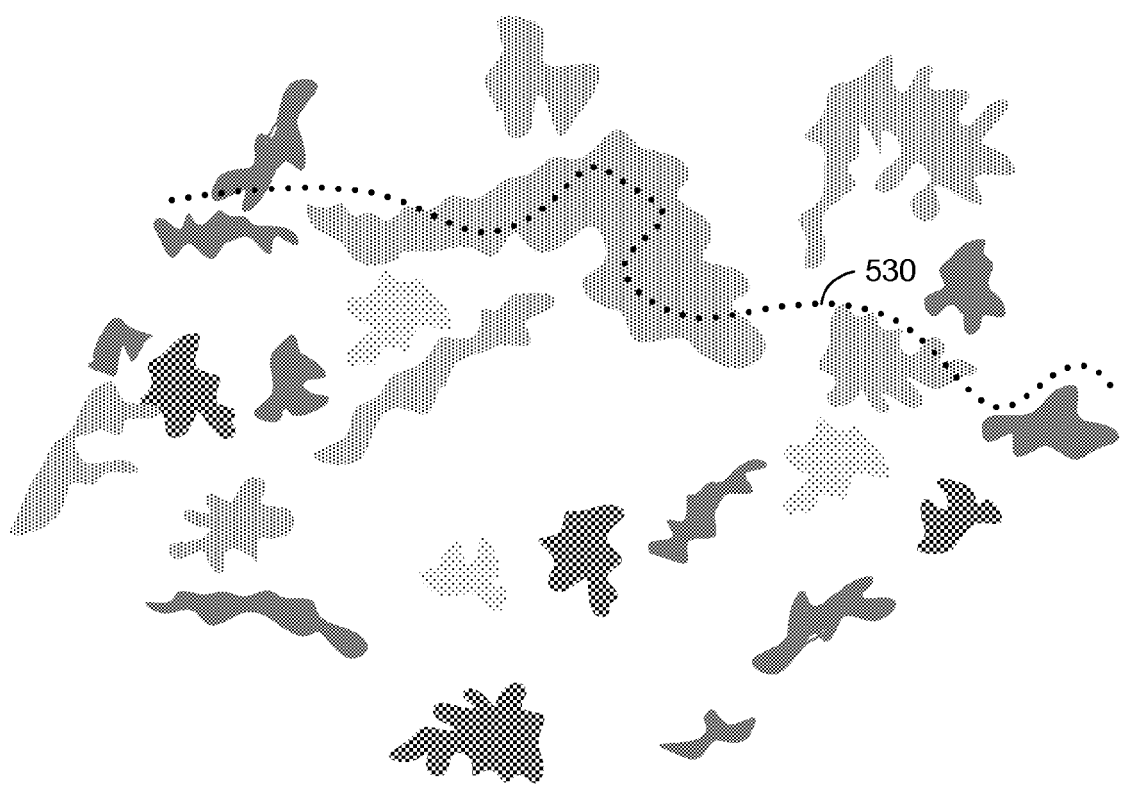

In one implementation, the reconstruction may be performed by displaying the individual glaciers on the glaciological map 500 in the sequence of advancement. FIGS. 5B-5D illustrate a reconstruction of a sequence of glacial advancement based on the glaciers with boundaries 510, 520, and 530, respectively. As stated previously, the glacier with the best-preserved features may be displayed last.

Some useful applications of information provided by glacial geomorphologic mapping are summarized in TABLE 5 below.

TABLE 5

| FEATURE | | DETECTION | PREDICTED IMPACT | | |
|---|---|---|---|---|---|
| | | | LOGISTICS | SEISMIC SIGNAL | SURFACE NOISE |
| NON-SEASONAL FEATURES | GRAVEL RIDGES | TERRAIN CLASS PINE FOREST AND GLACIOLOGICAL INTERPRETATION | ACCESSIBLE | VELOCITY LOW AND VARIABLE DEPENDING ON CLAY CONTENTS | SLOW LOW FREQUENT RAYLEIGH WAVES |
| | DEPTH OF WATER TABLE | DEM FOR RS TERRAIN CLASS WATER FEATURES | NOT APPLICABLE | BOTTOM WEATHERING LAYER, REFERENCE FOR STATICS | DETERMINES BOTTOM FOR SURFACE MULTIPLE GENERATION |
| | CHANGE OF SURFACE CHARACTER | TERRAIN CLASS BOUNDARIES | POTENTIAL ACCESSIBILITY BOUNDARIES | CHANGE OF PROPAGATION VELOCITY, RISK OF BLOCKAGE | RISK OF REFLECTION AND/OR SCATTERING |
| SUMMER SEASONAL FEATURES | WATER | TERRAIN CLASS WATER FEATURES | INACCESSIBLE | VELOCITY 1400 M/S, NO S WAVES | MINOR |
| | SWAMP, MEADOW | TERRAIN CLASSES SWAMP AND MEADOWS | INACCESSIBLE | VELOCITY ~1400 M/S, NO S WAVES, HIGH ATTENUATION | SURFACE MULTIPLES |
| WINTER SEASONAL FEATURES | WATER | TERRAIN CLASS WATER FEATURES | ACCESSIBLE | VELOCITY > 2000 M/S | SURFACE AND FLEXURE WAVES, SCATTERING FROM CRACKS |
| | SWAMP, MEADOW | TERRAIN CLASSES SWAMP AND MEADOWS | ACCESSIBLE | VELOCITY ~2000 M/S, NO S WAVES, HIGH ATTENUATION | SURFACE MULTIPLES |

Figure 6:
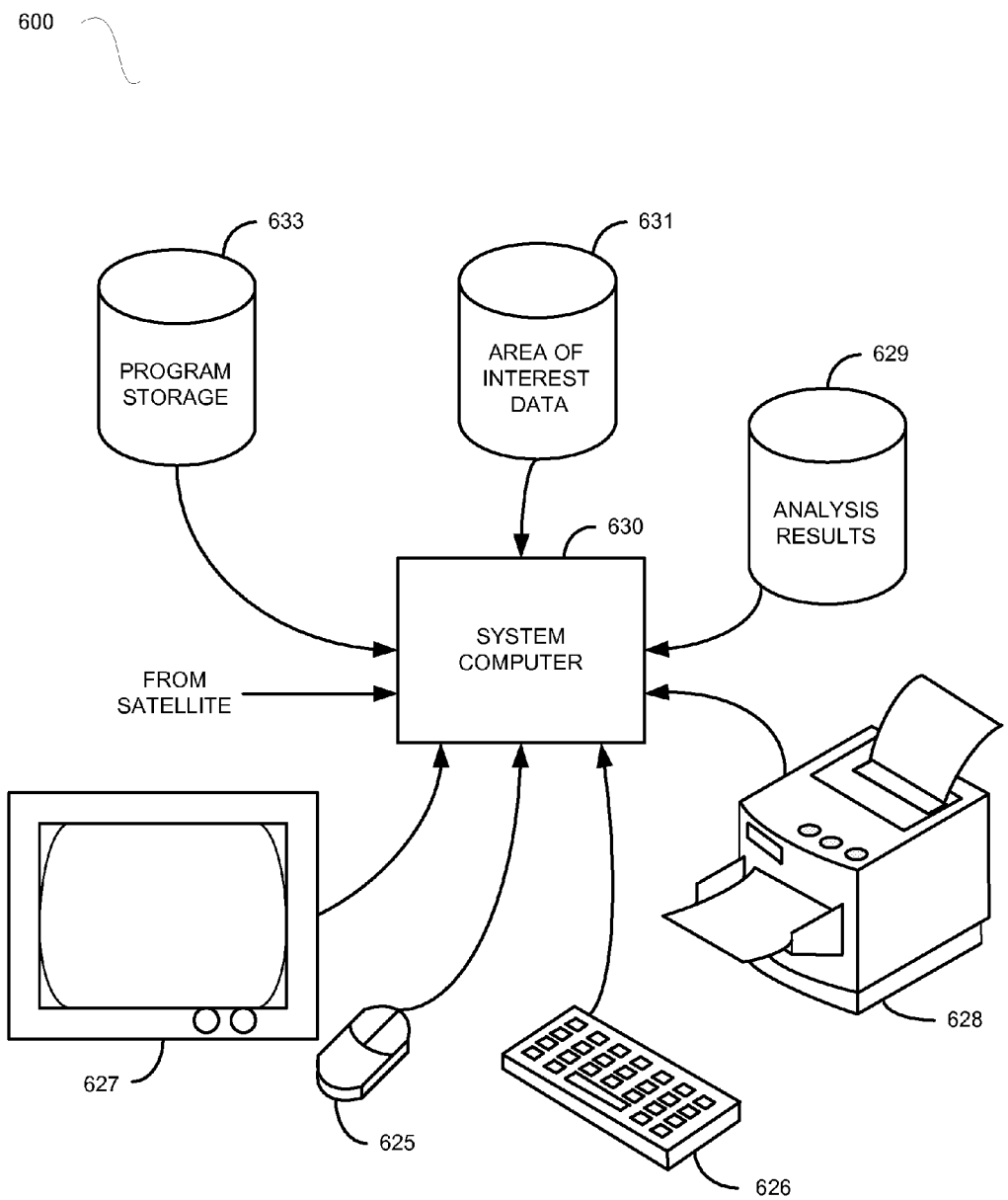
FIG. 6 illustrates a computer network into which implementations of various technologies described herein may be implemented.

FIG. 6 illustrates a computing system 600, into which implementations of various technologies described herein may be implemented. The computing system 600 may include one or more system computers 630, which may be implemented as any conventional personal computer or server. However, those skilled in the art will appreciate that implementations of various technologies described herein may be practiced in other computer system configurations, including hypertext transfer protocol (HTTP) servers, handheld devices, multiprocessor systems, microprocessor-based or programmable consumer electronics, network PCs, minicomputers, mainframe computers, and the like.

The system computer 630 may be in communication with disk storage devices 629, 631, and 633, which may be external hard disk storage devices. It is contemplated that disk storage devices 629, 631, and 633 are conventional hard disk drives, and as such, will be implemented by way of a local area network or by remote access. Of course, while disk storage devices 629, 631, and 633 are illustrated as separate devices, a single disk storage device may be used to store any and all of the program instructions, measurement data, and results as desired.

In one implementation, area of interest data for the digital elevation model 210A, and the satellite image 310A may be stored in disk storage device 631. The system computer 630 may retrieve the appropriate data from the disk storage device 631 to process area of interest data according to program instructions that correspond to implementations of various technologies described herein. The program instructions may be written in a computer programming language, such as C++, Java and the like. The program instructions may be stored in a computer-readable medium, such as program disk storage device 633. Such computer-readable media may include computer storage media and communication media.

Computer storage media may include volatile and nonvolatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer 630.

Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above may also be included within the scope of computer readable media.

In one implementation, the system computer 630 may present output primarily onto graphics display 627, or alternatively via printer 628. The system computer 630 may store the results of the methods described above on disk storage 629, for later use and further analysis. The keyboard 626 and the pointing device (e.g., a mouse, trackball, or the like) 625 may be provided with the system computer 630 to enable interactive operation.

The system computer 630 may be located at a data center remote from the area of interest. The system computer 630 may be in communication with a satellite (either directly or via a recording unit, not shown), to receive signals indicative of the satellite image 310A. These signals, after conventional formatting and other initial processing, may be stored by the system computer 630 as digital data in the disk storage 631 for subsequent retrieval and processing in the manner described above.

While FIG. 6 illustrates the disk storage 631 as directly connected to the system computer 630, it is also contemplated that the disk storage device 631 may be accessible through a local area network or by remote access. Furthermore, while disk storage devices 629, 631 are illustrated as separate devices for storing input data and analysis results, the disk storage devices 629, 631 may be implemented within a single disk drive (either together with or separately from program disk storage device 633), or in any other conventional manner as will be fully understood by one of skill in the art having reference to this specification.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for mapping glacial geomorphology, comprising:
   receiving a satellite image of an area of interest;
   receiving a digital elevation model of the area of interest;
   identifying plains and ridges on the digital elevation model;
   identifying swamps and forest on the satellite image; and
   generating, using a microprocessor, a glaciological map having glacial features based on the identified plains, ridges, swamps and forest, wherein the glaciological map is generated by correlating at least one of the plains and the ridges on the digital elevation model with at least one of the swamps and the forest on the satellite image.

2. The method of claim 1, wherein the glaciological map is generated by correlating the plains on the digital elevation model with the swamps on the satellite image; and correlating the ridges on the digital elevation model with the forest on the satellite image.

3. The method of claim 1, wherein the glacial features comprise one or more lateral moraines, one or more terminal moraines and one or more ground moraines.

4. The method of claim 1, wherein identifying the plains and ridges on the digital elevation model comprises:
   identifying areas on the digital elevation model having a gradient of less than 5 percent as a flat terrain;
   identifying areas on the digital elevation model having a gradient of greater than 20 percent as an escarpment; and
   identifying areas on the digital elevation model having a gradient of greater than 5 percent and less than 20 percent as a structured terrain.

5. The method of claim 1, identifying the swamps and forest on the satellite image comprises:
   identifying regions on the satellite image that are red as swamps; and
   identifying regions on the satellite image that are dark green as forest.

6. The method of claim 1, further comprising identifying boundaries of one or more glaciers based on the glacial features.

7. The method of claim 6, wherein each glacier is defined by a first lateral moraine on one side of the glacier, a second lateral moraine on the opposite side of the glacier, a terminal moraine at an end of the glacier and a ground moraine disposed between the first lateral moraine, the second lateral moraine and the terminal moraine.

8. The method of claim 6, further comprising reconstructing a sequence of a glacial advancement of the glaciers.

9. A method for mapping glacial geomorphology, comprising:
   receiving a satellite image of an area of interest;
   receiving a digital elevation model of the area of interest;
   identifying plains and ridges on the digital elevation model, wherein the identification of plains and ridges on the digital elevation model is used to estimate seismic surface wave velocities;
   identifying swamps and forest on the satellite image; and
   generating, using a microprocessor, a glaciological map having glacial features based on the identified plains, ridges, swamps and forest.

10. A method for mapping glacial geomorphology, comprising:
    receiving a satellite image of an area of interest;
    receiving a digital elevation model of the area of interest;
    identifying plains and ridges on the digital elevation model, wherein the identification of plains and ridges on the digital elevation model is used to estimate seismic surface wave noise and seismic wave attenuation;
    identifying swamps and forest on the satellite image; and
    generating, using a microprocessor, a glaciological map having glacial features based on the identified plains, ridges, swamps and forest.

11. A method for mapping glacial geomorphology, comprising:
    receiving a satellite image of an area of interest;
    receiving a digital elevation model of the area of interest;
    identifying plains and ridges on the digital elevation model;
    identifying swamps and forest on the satellite image;
    generating, using a microprocessor, a glaciological map having glacial features based on the identified plains, ridges, swamps and forest;
    identifying boundaries of one or more glaciers based on the glacial features; and
    reconstructing a sequence of a glacial advancement of the glaciers, wherein reconstructing the sequence comprises displaying the glacier having the glacial features that are best preserved last.

12. A method for mapping glacial geomorphology, comprising:
    receiving a satellite image of an area of interest;
    receiving a digital elevation model of the area of interest;
    identifying plains and ridges on the digital elevation model;
    identifying swamps and forest on the satellite image;
    generating, using a microprocessor, a glaciological map having glacial features based on the identified plains, ridges, swamps and forest;
    identifying boundaries of one or more glaciers based on the glacial features;
    reconstructing a sequence of a glacial advancement of the glaciers; and
    using the glaciological map for logistical planning of a seismic acquisition in the area of interest.

13. A method for mapping glacial geomorphology, comprising:
    receiving a satellite image of an area of interest;
    receiving a digital elevation model of the area of interest;
    identifying plains and ridges on the digital elevation model;
    identifying swamps and forest on the satellite image;
    generating, using a microprocessor, a glaciological map having glacial features based on the identified plains, ridges, swamps and forest; and
    using the glaciological map for logistical planning of a seismic acquisition in the area of interest.

14. A system, comprising:
    a processor; and
    a memory comprising computer-executable instructions which, when executed, cause the processor to:
    receive a satellite image of an area of interest;
    receive a digital elevation model of the area of interest;

identify plains and ridges on the digital elevation model;
identify swamps and forest on the satellite image;
generate a glaciological map having glacial features based on the identified plains, ridges, swamps and forest, wherein the glacial features comprise one or more lateral moraines, one or more terminal moraines and one or more ground moraines, and wherein the glaciological map is generated by correlating at least one of the plains and the ridges on the digital elevation model with at least one of the swamps and the forest on the satellite image;
identify boundaries of a plurality of glaciers based on the glacial features; and
reconstruct a sequence of a glacial advancement of the plurality of glaciers.

15. A system, comprising:
a processor; and
a memory comprising computer-executable instructions which, when executed, cause the processor to:
receive a satellite image of an area of interest;
receive a digital elevation model of the area of interest;
identify plains and ridges on the digital elevation model;
identify swamps and forest on the satellite image;
generate a glacioloqical map having glacial features based on the identified plains, ridges, swamps and forest, wherein the glacial features comprise one or more lateral moraines, one or more terminal moraines and one or more around moraines;
identify boundaries of a plurality of glaciers based on the glacial features;
reconstruct a sequence of a glacial advancement of the plurality of glaciers; and
use the glaciological map for logistical planning of a seismic acquisition in the area of interest.

16. A system, comprising:
a processor; and
a memory comprising computer-executable instructions which, when executed, cause the processor to:
receive a satellite image of an area of interest;
receive a digital elevation model of the area of interest;
identify plains and ridges on the digital elevation model, wherein identification of plains and ridges on the digital elevation model is used to estimate:
seismic surface wave velocities;
surface wave noise;
seismic wave attenuation; or
combinations thereof;
identify swamps and forest on the satellite image;
generate a glaciological map having glacial features based on the identified plains, ridges, swamps and forest, wherein the glacial features comprise one or more lateral moraines, one or more terminal moraines and one or more ground moraines;
identify boundaries of a plurality of glaciers based on the glacial features; and
reconstruct a sequence of a glacial advancement of the plurality of glaciers.

17. A method for mapping glacial geomorphology, comprising:
receiving a satellite image of an area of interest;
receiving a digital elevation model of the area of interest;
identifying plains and ridges on the digital elevation model, wherein identifying the plains and ridges on the digital elevation model comprises:
identifying areas on the digital elevation model having a gradient of less than 5 percent as a flat terrain;
identifying areas on the digital elevation model having a gradient of greater than 20 percent as an escarpment;
identifying areas on the digital elevation model having a gradient of greater than 5 percent and less than 20 percent as a structured terrain; and
performing a statistical analysis on the identified areas to identify regions of areas as plains or ridges;
identifying swamps and forest on the satellite image; and
generating, using a microprocessor, a glaciological map having glacial features based on the identified plains, ridges, swamps and forest.

18. The method of claim 17, wherein performing the statistical analysis comprises creating a hypsographic curve.

19. A non-transitory computer-readable medium containing computer-executable instructions which, when executed by a processor, cause a computer to:
receive a satellite image of an area of interest;
receive a digital elevation model of the area of interest;
identify plains and ridges on the digital elevation model;
identify swamps and forest on the satellite image;
generate a glaciological map having glacial features based on the identified plains, ridges, swamps and forest, wherein the glacial features comprise one or more lateral moraines, one or more terminal moraines and one or more ground moraines, and wherein the glaciological map is generated by correlating at least one of the plains and the ridges on the digital elevation model with at least one of the swamps and the forest on the satellite image; and
identify boundaries of one or more glaciers based on the glacial features.

20. The computer-readable medium of claim 19, wherein the glaciological map is generated by correlating the plains on the digital elevation model with the swamps on the satellite image; and correlating the ridges on the digital elevation model with the forest on the satellite image.

* * * * *